(12) United States Patent
Lee et al.

(10) Patent No.: US 9,079,473 B2
(45) Date of Patent: Jul. 14, 2015

(54) COUPLED TORSION BEAM AXLE TYPE SUSPENSION SYSTEM

(71) Applicant: Hyundai Motor Company, Seoul (KR)

(72) Inventors: Jaekil Lee, Suwon-si (KR); Seon Pyung Kim, Seoul (KR); Youn Hyung Cho, Seoul (KR); Jin-Ho Jung, Hwaseong-si (KR); Seong Hee Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/485,356

(22) Filed: Sep. 12, 2014

(65) Prior Publication Data

US 2015/0123370 A1     May 7, 2015

(30) Foreign Application Priority Data

Nov. 4, 2013 (KR) ........................ 10-2013-0132958

(51) Int. Cl.
    *B60G 21/05*      (2006.01)

(52) U.S. Cl.
    CPC .................................... *B60G 21/052* (2013.01)

(58) Field of Classification Search
    CPC .... B60G 9/003; B60G 21/051; B60G 21/052; B60G 21/053; B60G 2204/1226; B60G 2200/21
    USPC .................................... 280/124.128, 124.107
    See application file for complete search history.

(56) References Cited

U.S. PATENT DOCUMENTS

| 4,834,416 A * | 5/1989 | Shimoe et al. ........... 280/124.13 |
| 2006/0273530 A1* | 12/2006 | Zuber .......................... 280/5.52 |
| 2010/0059959 A1* | 3/2010 | Kim ....................... 280/124.116 |

FOREIGN PATENT DOCUMENTS

| JP | 2001-039136 (A) | 2/2001 |
| JP | 2006-335118 (A) | 12/2006 |
| KR | 10-0882667 (B1) | 2/2009 |
| KR | 10-2013-0125062 (A) | 11/2013 |

* cited by examiner

*Primary Examiner* — Ruth Ilan
(74) *Attorney, Agent, or Firm* — Morgan, Lewis & Bockius LLP

(57) ABSTRACT

A coupled torsion beam axle type suspension system (CTBA) may include trailing arms respectively coupled to opposite ends of a torsion beam, and a vehicle body-engaging unit provided in a front end portion of each of the trailing arm and engaging the each of the trailing arms to a vehicle body, wherein each vehicle body-engaging unit includes a trailing arm bush that may be coupled to a front end portion of the trailing arm, a rotation link disposed in front of the trailing arm bush and engaged thereto in a width direction of a vehicle, a slider rotatably connected to a front end portion of the rotation link, and slidable along a length direction of the vehicle body, and a connection link pivotally connecting an outer end portion of the rotation link and the vehicle body.

9 Claims, 7 Drawing Sheets

COUPLED TORSION BEAM AXLE TYPE SUSPENSION SYSTEM

CROSS-REFERENCE TO RELATED APPLICATION

The present application claims priority to and the benefit of Korean Patent Application No. 10-2013-0132958 filed on Nov. 4, 2013, the entire contents of which is incorporated herein for all purposes by this reference.

BACKGROUND OF THE INVENTION

1. Field of the Invention

The present invention relates to a coupled torsion beam axle type suspension system, and more particularly, to a coupled torsion beam axle type suspension system for improving single impact characteristics of an outer rear wheel with respect to thrust and drag forces as well as controlling movement (i.e., toe) characteristics thereof with respect to a side force, when a vehicle turns.

2. Description of Related Art

Generally, despite a limitation in design performance factors such as ride comfort, driving stability, etc., a coupled torsion beam axle type suspension system (hereinafter referred to as a CTBA) has been primarily applied to rear wheel suspension systems for compact and mid-size cars, compared with independent-type suspension systems, because they have advantages of light weight and low production cost due to their simpler components.

FIG. 1 is a perspective view of a CTBA according to one example of the related art.

Referring to FIG. 1, the CTBA according to one example of the related art is provided with a torsion beam 1 in a width direction of a vehicle, trailing arms 5 respectively coupled to opposite ends of the torsion beam 1, and carriers 3 for mounting wheel tires at the trailing arms 5.

A spring seat 9 for mounting a spring 7 thereon and a shock absorber pin 13 for coupling with a shock absorber 11 are provided at a rear inner portion of the trailing arm 5. In addition, a vehicle body-engaging unit 15 is provided at a front end portion of the trailing arm 5 to be coupled to a vehicle body.

Each vehicle body-engaging unit 15 includes a trailing arm bush 21 that is coupled to the front end portion of the trailing arm 5, and a mounting bracket 23 that is coupled to the trailing arm bush 21 through a bolt 25.

According to the CTBA having the aforementioned configuration, wheels are deformed due to twisting deformation characteristics of the torsion beam 1, and in addition to that, positions of the trailing arm 5 and a configuration of the vehicle body-engaging unit 15 cause deformation of the wheels.

The vehicle should maintain an under-steering tendency in consideration of driving stability when it turns, and for this purpose, it is ideal that a rear outer wheel of a turning vehicle (hereinafter referred to as a rear outer wheel) should be induced to toe-in and a rear inner wheel of the turning vehicle (hereinafter referred to as a rear inner wheel) should be induced to toe-out.

However, the conventional CTBA has following problems in its movement.

FIG. 2 is a top plan view illustrating movement characteristics of the coupled torsion beam axle type suspension system, applied with a side force, according to one example of the related art.

As shown in FIG. 2, though the CTBA according to one example of the related art is not mechanically moveable when applied with a side force F1, the entire CTBA rotates by the deformation of the trailing arm bush 21 and generates a toe angle at the rear outer wheel W1.

That is, when the vehicle turns, the bumped rear outer wheel W1 is applied with the side force F1 and thus is likely to be induced to toe-out, while the rebounded rear inner wheel W2 is applied with the side force F1 and thus is likely to maintain the previous toe angle or to be induced to toe-in, such that the vehicle is over-steered in general and thus causes deterioration of turning stability.

As a mechanical instantaneous rotational center point SP of the CTBA with respect to the vehicle body (i.e., an intersection of lines that extend in engaging directions of the trailing arm bushes 21 engaged to the vehicle body) is positioned in front of the wheel centers WC, the rear outer wheel W1 has a tendency to toe-out due to the side force F1 while the rear inner wheel W2 has a tendency to toe-in due to the side force F1.

Recently, in order to solve such a turning stability problem of the conventional CTBA, suspension systems are being developed to improve a structure of the vehicle body and the vehicle body-engaging unit of the trailing arm 5 such that the instantaneous rotational center point SP of the CTBA with respect to the vehicle body is positioned behind the wheel centers WC.

FIG. 3 is a top plan view of a coupled torsion beam axle type suspension system according to another example of the related art.

Referring to FIG. 3 the improved CTBA according to the other example is provided with a rotation link 31 as a vehicle body-engaging unit 15 between a vehicle body and a trailing arm bush 21, such that an instantaneous rotational center point SP with respect to the vehicle body is positioned behind wheel centers WC.

That is, a rear end portion of the rotation link 31 is in parallel engaged to the trailing arm bush 21 in a width direction of the vehicle, and a front end portion thereof is provided with a vehicle body-mounting bush 33 that is moveable with respect to the vehicle body in a rotating direction, thereby being engaged to one lower portion of the vehicle body.

In this case, the vehicle body-mounting bush 33 is coupled to the trailing arm bush 21 through the rotation link 31 and is engaged to the vehicle body in the height direction of the vehicle, such that it is engaged to the vehicle body at an outer front of the rotation link in the width direction of the vehicle.

Thus, the instantaneous rotational center point SP of the CTBA with respect to the vehicle body is formed at an intersection of the extending lines that connect centers S1 of the mounting bushes 33 with centers S2 of the trailing arm bushes 21, and is positioned behind the wheel centers WC.

As such, in the CTBA according to the current example, the instantaneous rotational center point SP with respect to the vehicle body is positioned behind the wheel centers WC, such that it has following movement characteristics with respect to the side force F1 and the thrust and drag forces.

FIG. 4 C1, C2, and C3 are top plan views illustrating movement characteristics of the coupled torsion beam axle type suspension system, applied with the side force and the thrust and drag forces, according to another example of the related art.

In FIG. 4 C1, when rear wheels are applied with the side force F1, the bumped rear outer wheel is induced to toe-in while the rebounded rear outer turning wheel W2 maintains a set toe-in angle or is induced to toe-out, such that the vehicle is generally under-steered to secure the turning stability.

Meanwhile, the CTBA is induced to rotate based on the instantaneous rotational center point SP when the rear wheels are applied with the thrust and drag forces F2 as well as the side force F1.

That is, in FIG. 4 C2, in the CTBA according to another example, in a double impact environment in which the rear wheels are simultaneously applied with the thrust and drag forces, such as when the vehicle brakes or passes over a speed bump, rotation of the CTBA is offset by symmetrical rotation of the rear wheels, thereby guaranteeing the driving stability.

However, in FIG. 4 C3, in a single impact environment in which one of the rear wheels is asymmetrically applied with the thrust and drag forces F2, the corresponding rear wheel is induced to toe-out which makes the movement characteristics of the CTBA unstable in general, thereby deteriorating the driving stability as in the previous example according to the related art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coupled torsion beam axle type suspension system that may include trailing arms respectively coupled to opposite ends of a torsion beam, and a vehicle body-engaging unit provided in a front end portion of each of the trailing arm and engaging the each of the trailing arms to a vehicle body, wherein each vehicle body-engaging unit may include a trailing arm bush that is coupled to a front end portion of the trailing arm, a rotation link disposed in front of the trailing arm bush and engaged thereto in a width direction of a vehicle, a slider rotatably connected to a front end portion of the rotation link, and slidable along a length direction of the vehicle body, and a connection link pivotally connecting an outer end portion of the rotation link and the vehicle body, such that an instantaneous rotational center point of the rotation link is formed outside of the rotation link in the width direction of the vehicle.

A guide hole is formed to the vehicle body along the length direction of the vehicle body, and the slider is rotatably connected to the front end portion of the rotation link through a mounting bearing, and slidibly mounted within the guide hole.

The connection link is rotatably connected to the outer end portion of the rotation link through a mounting bearing, and is connected to the vehicle body through a mounting bush.

An instantaneous rotational center point of the rotation link is formed at an intersection of a vehicle width direction virtual line passing a center point of the slider and an extending line of the connection links in length directions thereof.

An intersection of extending lines that pass the instantaneous rotational center points of the rotation links and centers of the trailing arm bushes forms an instantaneous rotational center point of the CTBA, and the instantaneous rotational center point of the CTBA is positioned behind wheel centers.

In another aspect of the present invention, in a coupled torsion beam axle type suspension system, in which opposite ends of a torsion beam are coupled to left and right trailing arms and the left and right trailing arms are coupled to vehicle body-engaging units for being mounted on the vehicle body at front end portions thereof, each vehicle body-engaging unit may include a trailing arm bush connected to the front end portion of the trailing arm, a rotation link disposed in front of the trailing arm bush and engaged to the trailing arm bush in a width direction of the vehicle, a slider rotatably connected to a front end portion of the rotation link, and slidably mounted within a guide hole formed to the vehicle body, and a connection link configured to couple an outer end portion of the rotation link to the vehicle body, wherein an instantaneous rotational center point of the CTBA, of which an intersection of extending lines that pass an instantaneous rotational center points of the rotation links and centers of the trailing arm bushes forms, is positioned behind wheel centers.

The slider is rotatably connected to the front end portion of the rotation link through a mounting bearing, and is slidibly mounted within a guide hole formed to the vehicle body along a length direction of the vehicle body.

A first end of the connection link is rotatably connected to the outer end portion of the rotation link through a mounting bearing, and a second end of the connection link is connected to the vehicle body through a mounting bush.

The instantaneous rotational center point of the rotation link is formed at an intersection of a vehicle width direction virtual line passing a center point of the slider and an extending line of the connection links in length directions thereof.

The exemplary embodiment of the present invention may allow the instantaneous rotational center point of the CTBA to be positioned behind wheel centers by coupling the rotation link coupled to the trailing arm bush to the vehicle body through the slider and the connection link, such that the outer rear wheel is induced to toe-in and the inner rear wheel is induced to toe-out so as to cause the vehicle to be understeered, thereby securing the turning stability thereof.

In addition, in a single impact situation when one of the rear-wheels is asymmetrically applied with the thrust and drag forces, such as when driving on a rough road, the instantaneous rotational center point CP of the rotation link with respect to the vehicle body varies and thus the instantaneous rotational center point of the CTBA is moved outside of a line of action where the thrust and drag forces are applied, thereby decreasing the amount of toe-out.

That is, the amount of rotation of the corresponding rear wheel in a toe-out direction is decreased to secure the overall driving stability of the CTBA.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
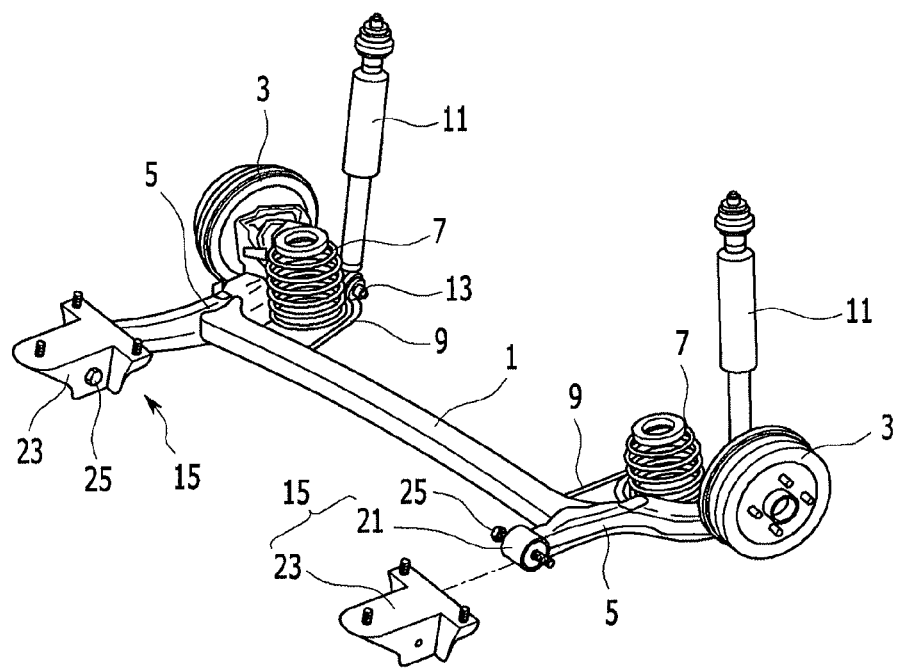
FIG. 1 is a perspective view of a coupled torsion beam axle type suspension system according to one example of the related art.
Figure 2:
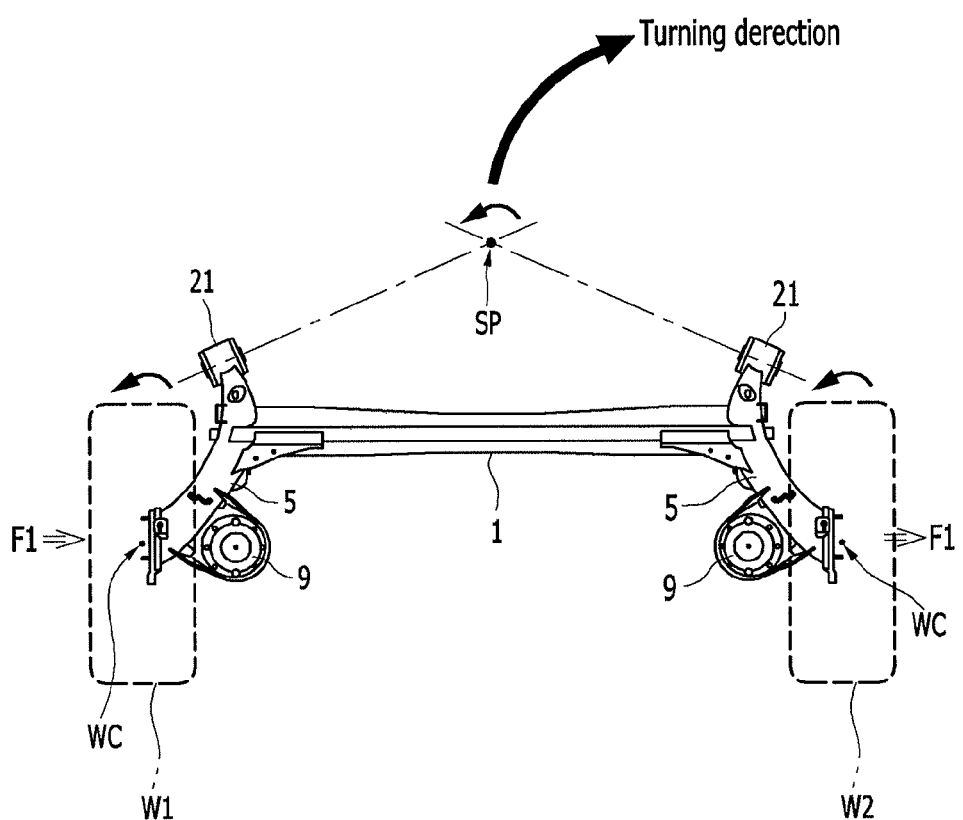
FIG. 2 is a top plan view illustrating movement characteristics of the coupled torsion beam axle type suspension system, applied with a side force, according to one example of the related art.
Figure 3:
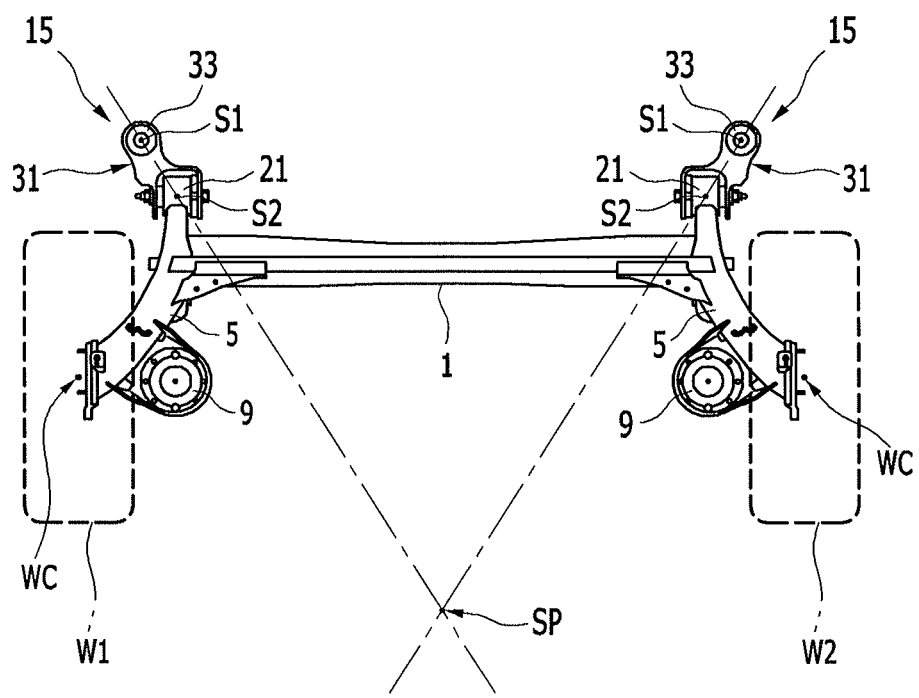
FIG. 3 is a top plan view of a coupled torsion beam axle type suspension system according to another example of the related art.
Figure 4:
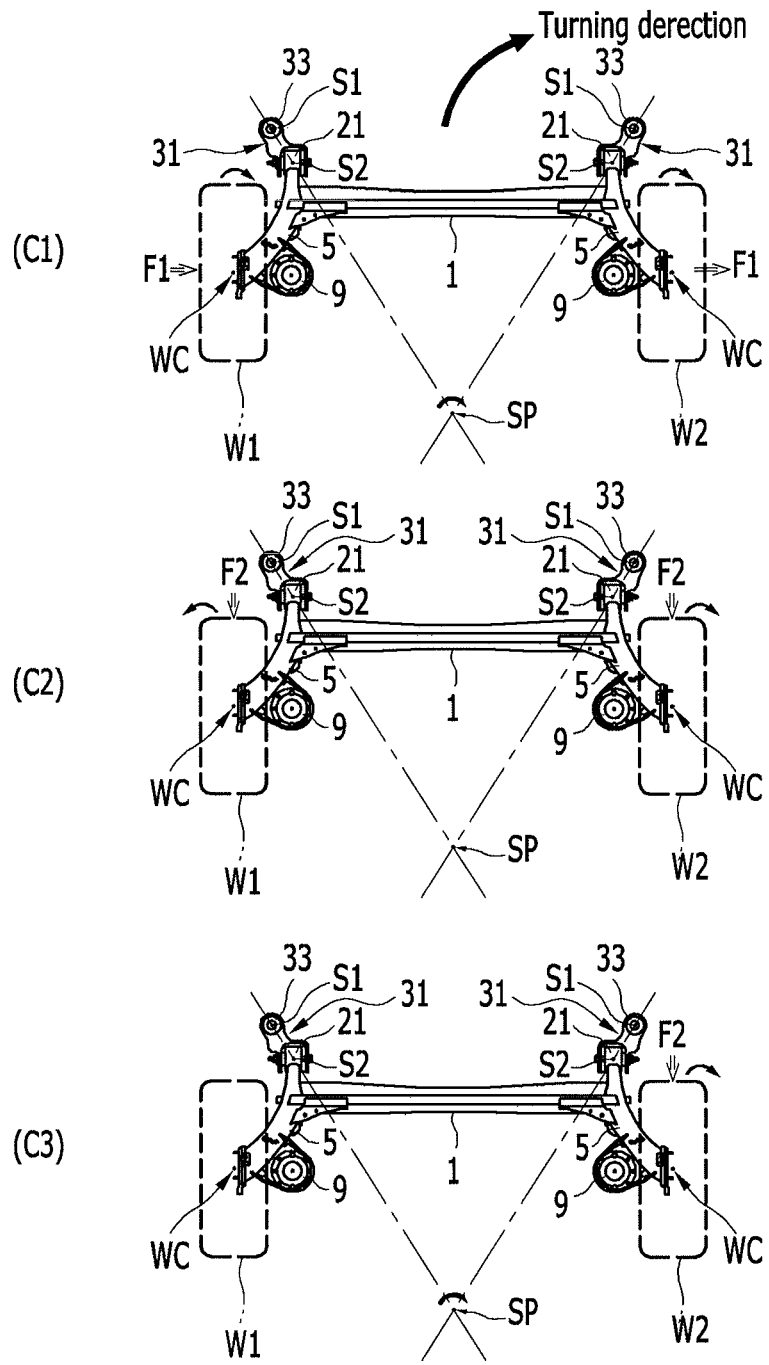
FIG. 4 C1, C2, and C3 are top plan views illustrating movement characteristics of the coupled torsion beam axle type suspension system, applied with the side force and thrust and drag forces, according to another example of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the exemplary embodiments of the present invention, and like reference numerals designate like elements throughout the specification, which also applies to the related art.

Figure 5:
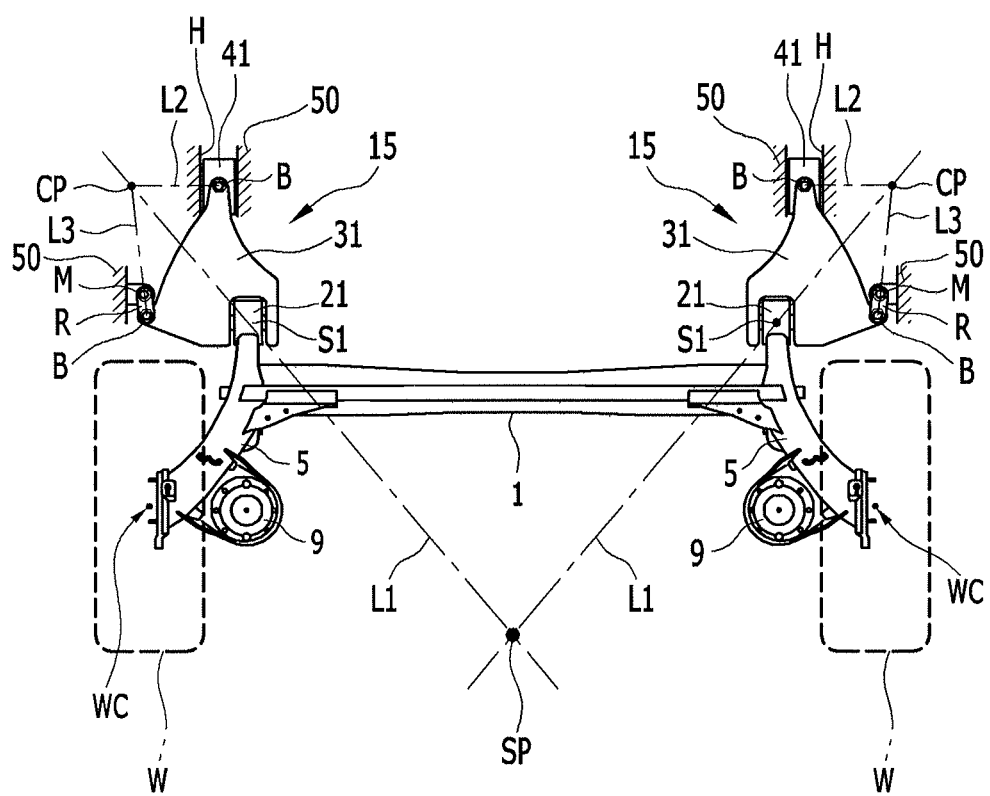
FIG. 5 is a top plan view of a coupled torsion beam axle type suspension system according to an exemplary embodiment of the present invention.

Further, when describing an exemplary embodiment of the present invention, for ease of description, it is assumed that an upper portion of FIG. 5 is defined as a front direction and a lower portion is defined as a rear direction. A coupled torsion beam axle type suspension system according to an exemplary embodiment of the present invention is symmetrically provided in each rear wheel of a vehicle, and for ease of description, a description of one side will be applicable to the other side.

Figure 6:
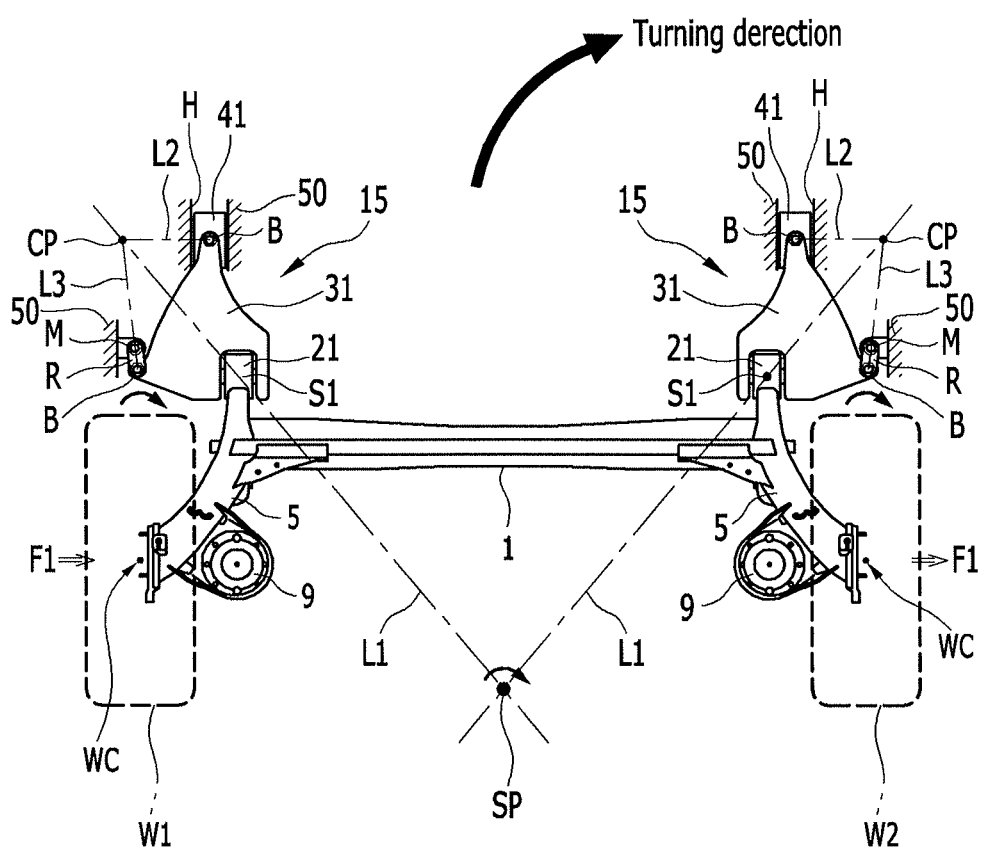
FIG. 6 is a top plan view illustrating movement characteristics of the coupled torsion beam axle type suspension system, applied with the side force according to the exemplary embodiment of the present invention.
Figure 7:
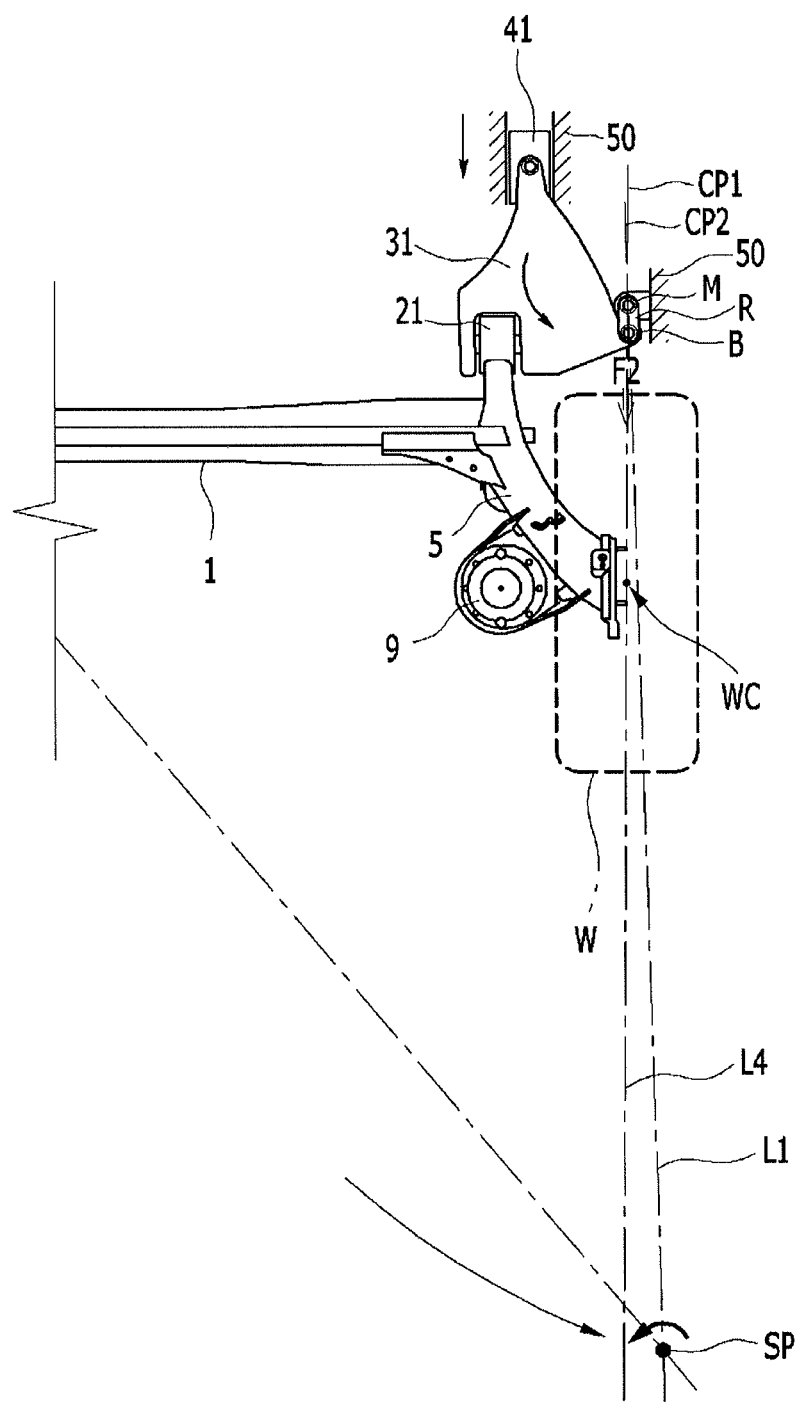
FIG. 7 is a top plan view illustrating movement characteristics of the coupled torsion beam axle type suspension system, applied with the thrust and drag forces according to the exemplary embodiment of the present invention.

FIG. 5 is a top plan view of a coupled torsion beam axle type suspension system according to an exemplary embodiment of the present invention, FIG. 6 is a top plan view illustrating movement characteristics of the coupled torsion beam axle type suspension system, applied with a side force according to the exemplary embodiment of the present invention, and FIG. 7 is a top plan view illustrating movement characteristics of the coupled torsion beam axle type suspension system, applied with thrust and drag forces according to the exemplary embodiment of the present invention.

Referring to FIG. 5, a coupled torsion beam axle type suspension system (hereinafter referred to as a CTBA) is provided with a torsion beam 1 in a width direction of a vehicle, and trailing arms 5 respectively fixed to opposite ends of the torsion beam 1.

A vehicle body-engaging unit 15 is provided at a front end portion of the trailing arms 5 to be coupled to a vehicle body 50.

In the CTBA according to the exemplary embodiment of the present invention, each vehicle body-engaging unit 15 includes a trailing arm bush 21, a rotation link 31, a slider 41 and a connection link R.

The trailing arm bush 21 is coupled to the front end portion of the trailing arm 5.

The rotation link 31 is disposed in front of the trailing arm bush 21, and is in parallel engaged with the trailing arm bush 21 in the width direction of the vehicle.

The slider 41 is rotatably connected to a front end portion of the rotation link 31, and is slidably disposed within a guide hole H formed to the vehicle body 50 along the length direction of the vehicle body 50.

The slider is 41 rotatably connected to the front end portion of the rotation link 31 through a mounting bearing B, and is inserted into the guide hole H.

The connection link R is rotatably connected to an outer end portion of the rotation link 31, and the slider 41 and the connection link R respectively couple the front and outer end portions of the rotation link 31 to the vehicle body 50, such that an instantaneous rotational center point CP is formed outside of the rotation link 31 in the width direction of the vehicle.

The connection link R is disposed between an outer end portion of the rotation link 31 and the vehicle body 50 such that its opposite ends are respectively coupled to the outer end portion of the rotation link 31 and the vehicle body 50. The connection link R is rotatably connected to the rotation link 31 through a mounting bearing B and connected to the vehicle body 50 though a mounting bush M.

Referring to FIG. 6, the slider 41 and the connection link R respectively couple the front and outer end portions of the rotation link 31 to the vehicle body 50, such that the instantaneous rotational center point CP is formed outside of the rotation link 31 in the width direction of the vehicle.

The instantaneous rotational center point CP of the rotation link 31 is formed at an intersection of a vehicle width direction virtual line L2 passing a center point of the slider 41 and an extending line L3 of the connection link R in length directions thereof.

That is, the rotation link 31 rotates around the instantaneous rotational center point CP, which is an intersection of the virtual line L2 vertical to the movement of the mounting bearing B connected to the slider 41, and the extending line L3 of the connection link R.

Further, in the exemplary embodiment of the present invention, an instantaneous rotational center point SP is formed at the intersection of extending lines L1 that pass the instantaneous rotational center points CP of the rotation links 31 and centers S1 of the trailing arm bushes 21.

In this case, the instantaneous rotational center point SP of the CTBA is set such that it is positioned behind the wheel centers WC.

Accordingly, in the CTBA according to the exemplary embodiment of the present invention, as shown in FIG. 6, the instantaneous rotational center point SP of the CTBA with respect to the vehicle body, which is formed by the intersection of the extending lines L1 that pass the instantaneous rotational center points CP of the rotation links 31 and the centers S1 of the trailing arm bushes 21, is formed behind the wheel centers WC.

Accordingly, in the CTBA according to the exemplary embodiment of the present invention, the rotation links 31 form a four-node link apparatus between the trailing arms 5 and the vehicle body, in which the instantaneous rotational center points CP due to the slider 41 and the connection link R, and the centers S1 of the trailing arm bushes 21 are used as pivot points.

Thus, referring to FIG. 6, in the CTBA, when the rear wheels are applied with the side force F1, such as when the vehicle turns, the outer rear wheel W1 rotated and bumped based on the instantaneous rotational center point SP is induced to toe-in and thus the vehicle is under-steered in general, thereby securing the turning stability.

Further, referring to FIG. 7, in a single impact situation when one of the rear-wheels W is asymmetrically applied with the thrust and drag forces F2, such as when the vehicle is driven on a rough road, the slider 41 moves rearward of the vehicle body 50. That is, the rotation link 31 instantaneously rotates counter-clockwise in the drawing. Thus, the instantaneous rotational center points CP of the rotation link 31 moves inwardly as described as from CP1 to CP2, and accordingly, the instantaneous rotational center point SP is moved further closer to the wheels, which are applied with the thrust and drag forces F2, thereby decreasing a generated amount of toe-out.

That is, the CTBA according to the exemplary embodiment of the present invention does not use physical joints, such as conventional bearings, as the pivots between the rotation links 31 and the vehicle body, but uses the mounting bushes M to change the instantaneous center of the mechanism. Accordingly, the instantaneous rotational center between the CTBA and the vehicle body is moved outside of a line of action L4 and thus reverses a rotational direction with respect to the thrust and drag forces F, such that the amount of rotation is finally decreased in the toe-out direction to secure the overall driving stability of the CTBA.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle type suspension system (CTBA), comprising:
   trailing arms respectively coupled to opposite ends of a torsion beam; and
   a vehicle body-engaging unit provided in a front end portion of each of the trailing arms and engaging the each of the trailing arms to a vehicle body,
   wherein each vehicle body-engaging unit includes:
      a trailing arm bush that is coupled to a front end portion of the trailing arm;
      a rotation link disposed in front of the trailing arm bush and engaged thereto in a width direction of a vehicle;
      a slider rotatably connected to a front end portion of the rotation link, and slidable along a length direction of the vehicle body; and
      a connection link pivotally connecting an outer end portion of the rotation link and the vehicle body, such that an instantaneous rotational center point of the rotation link is formed outside of the rotation link in the width direction of the vehicle.

2. The system of claim 1,
   wherein a guide hole is formed to the vehicle body along the length direction of the vehicle body; and
   wherein the slider is rotatably connected to the front end portion of the rotation link through a mounting bearing, and slidably mounted within the guide hole.

3. The system of claim 1, wherein the connection link is rotatably connected to the outer end portion of the rotation link through a mounting bearing, and is connected to the vehicle body through a mounting bush.

4. The system of claim 1, wherein an instantaneous rotational center point of the rotation link is formed at an intersection of a vehicle width direction virtual line passing a center point of the slider and an extending line of the connection links in length directions thereof.

5. The system of claim 4,
   wherein an intersection of extending lines that pass the instantaneous rotational center points of the rotation links and centers of the trailing arm bushes forms an instantaneous rotational center point of the CTBA; and
   wherein the instantaneous rotational center point of the CTBA is positioned behind wheel centers.

6. A coupled torsion beam axle type suspension system (CTBA), in which opposite ends of a torsion beam are coupled to left and right trailing arms and the left and right trailing arms are coupled to vehicle body-engaging units for being mounted on the vehicle body at front end portions thereof, wherein each vehicle body-engaging unit includes:
   a trailing arm bush connected to the front end portion of the trailing arm;
   a rotation link disposed in front of the trailing arm bush and engaged to the trailing arm bush in a width direction of the vehicle;
   a slider rotatably connected to a front end portion of the rotation link, and slidably mounted within a guide hole formed to the vehicle body; and
   a connection link configured to couple an outer end portion of the rotation link to the vehicle body,
   wherein an instantaneous rotational center point of the CTBA, of which an intersection of extending lines that pass an instantaneous rotational center points of the rotation links and centers of the trailing arm bushes forms, is positioned behind wheel centers.

7. The system of claim 6, wherein the slider is rotatably connected to the front end portion of the rotation link through a mounting bearing, and is slidably mounted within a guide hole formed to the vehicle body along a length direction of the vehicle body.

8. The system of claim 7, wherein a first end of the connection link is rotatably connected to the outer end portion of the rotation link through a mounting bearing, and a second end of the connection link is connected to the vehicle body through a mounting bush.

9. The system of claim 8, wherein the instantaneous rotational center point of the rotation link is formed at an intersection of a vehicle width direction virtual line passing a center point of the slider and an extending line of the connection links in length directions thereof.

\* \* \* \* \*